United States Patent
Huang (10) Patent No.: US 9,198,087 B2
(45) Date of Patent: Nov. 24, 2015

(54) BASE STATION HANDOVER METHOD, BASE STATION CONTROLLER, AND MOBILE TERMINAL

(71) Applicant: HUAWEI TECHNOLOGIES CO., LTD., Shenzhen (CN)

(72) Inventor: Wenli Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 155 days.

(21) Appl. No.: 13/779,042

(22) Filed: Feb. 27, 2013

(65) Prior Publication Data

US 2013/0171994 A1 Jul. 4, 2013

Related U.S. Application Data

(63) Continuation of application No. PCT/CN2011/084463, filed on Dec. 22, 2011.

(51) Int. Cl.
*H04W 36/00* (2009.01)
*H04W 72/00* (2009.01)

(52) U.S. Cl.
CPC ...... *H04W 36/0005* (2013.01); *H04W 36/0072* (2013.01)

(58) Field of Classification Search
CPC ..................................................... H04W 36/00
USPC ........................................................ 455/436
See application file for complete search history.

(56) References Cited

U.S. PATENT DOCUMENTS

| | | | |
|---|---|---|---|
| 6,519,461 B1 * | 2/2003 | Andersson et al. ............ | 455/453 |
| 7,933,602 B1 * | 4/2011 | Balakrishnan et al. ....... | 455/437 |
| 2002/0126637 A1 | 9/2002 | Refai et al. | |
| 2003/0161284 A1 | 8/2003 | Chen | |

FOREIGN PATENT DOCUMENTS

| | | |
|---|---|---|
| CN | 1791269 A | 6/2006 |
| CN | 1913706 | 2/2007 |
| CN | 101990265 | 3/2011 |
| EP | 1347662 | 9/2003 |
| WO | WO2006/039032 | 4/2006 |

OTHER PUBLICATIONS

Form PCT/ISA/210, dated Oct. 4, 2012, in corresponding International Application No. PCT/CN2011/084463, pp. 1-4.
Form PCT/ISA/220, dated Oct. 4, 2012, in corresponding International Application No. PCT/CN2011/084463, pp. 1-3.
Form PCT/ISA/237, dated Oct. 4, 2012, in corresponding International Application No. PCT/CN2011/084463, pp. 1-4.
Chinese Office Action issued Apr. 18, 2014, in corresponding Chinese Patent Application No. 201180003309.0.

* cited by examiner

*Primary Examiner* — Huy C Ho
(74) *Attorney, Agent, or Firm* — Staas & Halsey LLP (57) ABSTRACT

Embodiments of the present invention disclose a base station handover method, which includes: detecting, by a base station controller, that a mobile terminal is handed over from a first base station with low configuration to a second base station with high configuration; and instructing, by the base station controller, the mobile terminal to switch a radio configuration mode between the mobile terminal and the second base station to a high-capacity radio configuration mode. The embodiments of the present invention further disclose a base station controller and a mobile terminal. By adopting the embodiments of the present invention, the capacity of a base station can be increased.

6 Claims, 5 Drawing Sheets

BASE STATION HANDOVER METHOD, BASE STATION CONTROLLER, AND MOBILE TERMINAL

CROSS-REFERENCE TO RELATED APPLICATIONS

This application is a continuation of International Application No. PCT/CN2011/084463, filed on Dec. 22, 2011, which is hereby incorporated by reference in its entirety.

FIELD OF THE INVENTION

The present invention relates to the field of mobile communications, and in particular, to a base station handover method, a base station controller, and a mobile terminal.

BACKGROUND OF THE INVENTION

Currently, in a mobile communication system, for example, in a CDMA (code division multiple access) system, in RC (radio configuration), physical channel configuration of a CDMA radio signal is defined, such as a transmission rate, a modulation mode, and a spreading factor. In the CDMA, radio configuration includes: forward radio configuration and reverse radio configuration, where there are totally 12 types of forward radio configuration: 1 to 12, and there are totally 8 types of reverse radio configuration: 1 to 8; and forward radio configuration refers to from a base station to a mobile terminal, and reverse radio configuration refers to from a mobile terminal to a base station.

Currently, when a mobile terminal moves from a coverage area of one base station to a coverage area of another base station, a base station handover needs to be performed, and this process mainly includes: A mobile terminal establishes a call in a first base station and works in a radio configuration mode provided by the first base station, and when the mobile terminal moves from the first base station to a second base station, the mobile terminal is handed over to the second base station in a soft handover manner and works in a radio configuration mode that is provided by the second base station and is the same as the radio configuration mode provided by the first base station. When the mobile terminal is handed over from the first base station to the second base station, the mobile terminal works in the same radio configuration mode. Therefore, if the mobile terminal works in a low-capacity radio configuration mode when in the first base station, the mobile terminal also works in a low-capacity radio configuration mode when being handed over to the second base station; and if the second base station supports a high-capacity radio configuration mode; however, because the mobile terminal still works in a low-capacity radio configuration mode after being handed over to the second base station, the capacity of the second base station is lowered.

SUMMARY OF THE INVENTION

Embodiments of the present invention provide a base station handover method, a base station controller, and a mobile terminal, which can increase the capacity of a base station.

To solve the foregoing technical problem, an embodiment of the present invention provides a base station handover method, which includes:

detecting, by a base station controller, that a mobile terminal is handed over from a first base station with low configuration to a second base station with high configuration; and instructing, by the base station controller, the mobile terminal to switch a radio configuration mode between the mobile terminal and the second base station to a high-capacity radio configuration mode.

Correspondingly, an embodiment of the present invention further provides a base station handover method, which includes:

receiving, by a mobile terminal, a first message sent by a base station controller, where the first message is used to instruct the mobile terminal to switch a radio configuration mode between the mobile terminal and a second base station from a low-capacity radio configuration mode to a high-capacity radio configuration mode; and making, by the mobile terminal, a response to the first message, and switching the radio configuration mode between the mobile terminal and the second base station to the high-capacity radio configuration mode.

Correspondingly, an embodiment of the present invention further provides a base station controller, which includes:

a detecting module, configured to detect that a mobile terminal that supports high radio configuration is handed over from a first base station with low configuration to a second base station with high configuration; and an instructing module, configured to instruct the mobile terminal to switch a radio configuration mode between the mobile terminal and the second base station to a high-capacity radio configuration mode.

Correspondingly, an embodiment of the present invention further provides a mobile terminal, which includes:

a receiving module, configured to receive a first message sent by a base station controller, where the first message is used to instruct the mobile terminal to switch a radio configuration mode between the mobile terminal and a second base station from a low-capacity radio configuration mode to a high-capacity radio configuration mode; and a radio configuration mode switching module, configured to make a response to the first message and switch the radio configuration mode between the mobile terminal and the second base station to the high-capacity radio configuration mode.

Implementing the embodiments of the present invention has the following beneficial effects:

In the embodiments of the present invention, after a mobile terminal is handed over from a first base station with low configuration to a second base station with high configuration, a base station controller instructs the mobile terminal to switch a radio configuration mode between the mobile terminal and the second base station to a high-capacity radio configuration mode, thereby increasing the capacity of the second base station.

BRIEF DESCRIPTION OF THE DRAWINGS

To describe the technical solutions in the embodiments of the present invention or in the prior art more clearly, the accompanying drawings required for describing the embodiments are introduced briefly in the following. Apparently, the accompanying drawings in the following description show merely some embodiments of the present invention, and persons of ordinary skill in the art may still derive other drawings from these accompanying drawings without creative efforts.

DETAILED DESCRIPTION OF THE EMBODIMENTS

The technical solutions in the embodiments of the present invention are clearly described in the following with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
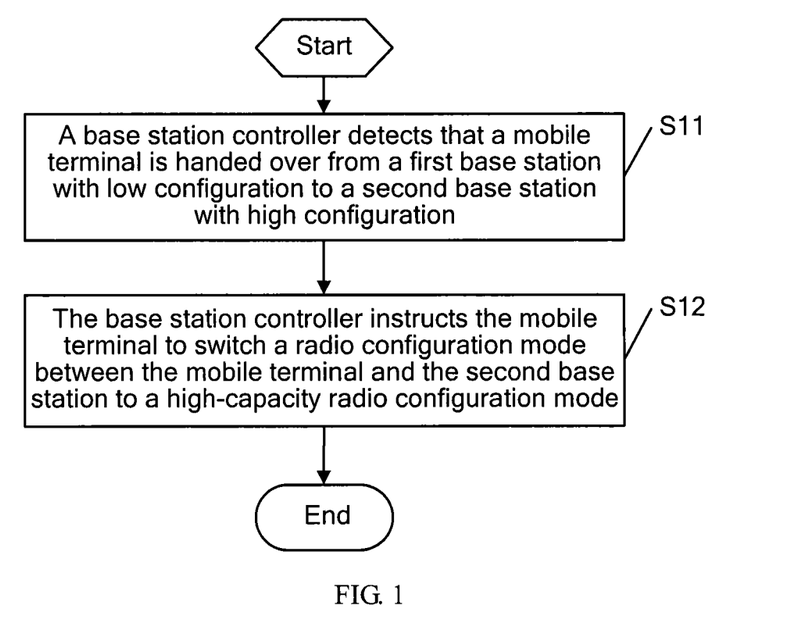
FIG. 1 is a schematic flow chart of a base station handover method according to a first embodiment of the present invention.

FIG. 1 is a schematic flow chart of a base station handover method according to a first embodiment of the present invention, and the method includes:

Step S11: A base station controller detects that a mobile terminal is handed over from a first base station with low configuration to a second base station with high configuration.

In step S11, the mobile terminal may be handed over from the first base station to the second base station by adopting a soft handover manner. Because the first base station is a base station with low configuration, a radio configuration mode between the mobile terminal and the first base station is a low-capacity radio configuration mode; and when the mobile terminal is handed over from the first base station to the second base station, although the second base station supports a high-capacity radio configuration mode, a radio configuration mode between the mobile terminal and the second base station is still a low-capacity radio configuration mode. In practice, generally, the higher a level of radio configuration is, the larger the capacity of the radio configuration is, for example, when forward RC3 is compared with forward RC11, because a level 11 of RC11 is higher than a level 3 of RC3, RC11 has higher capacity than RC3, that is, RC11 is high-capacity radio configuration relative to RC3. It should be noted that, a process of handing over a mobile terminal from one base station to another base station is obvious to persons skilled in the art, which is not described herein.

Step S12: The base station controller instructs the mobile terminal to switch a radio configuration mode between the mobile terminal and the second base station to a high-capacity radio configuration mode.

When being handed over to the second base station, the mobile terminal still uses a low-capacity radio configuration mode (at this time, low-capacity radio configuration is provided by the second base station) that is the same as that of the first base station; however, the second base station is a base station with high configuration and can provide high-capacity radio configuration. Therefore, in step S12, a radio configuration mode switching instruction message may be sent to the mobile terminal, so as to instruct the mobile terminal to switch from a low-capacity radio configuration mode to a high-capacity radio configuration mode, thereby making full use of a radio configuration resource of the second base station and increasing the capacity of the second base station. It should be noted that, the mobile terminal herein should also support a high-capacity radio configuration mode.

In this embodiment, after a mobile terminal is handed over from a first base station with low configuration to a second base station with high configuration, a base station controller instructs the mobile terminal to switch a radio configuration mode between the mobile terminal and the second base station to a high-capacity radio configuration mode, thereby avoiding that the mobile terminal still uses a low-capacity radio configuration mode when in the second base station and increasing the capacity of the second base station.

Figure 2:
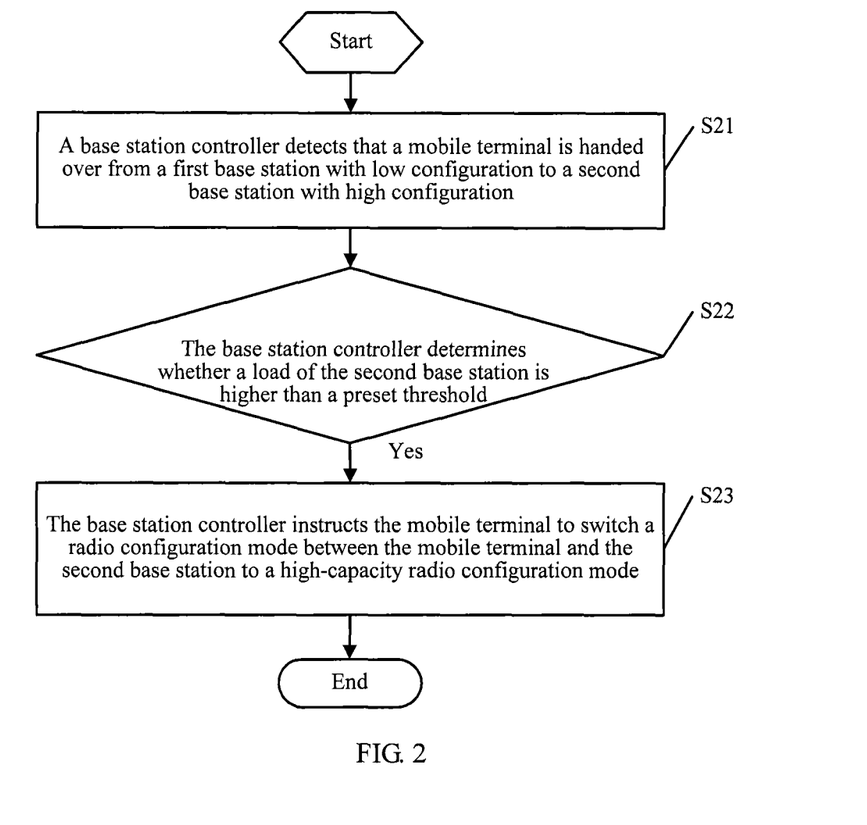
FIG. 2 is a schematic flow chart of a base station handover method according to a second embodiment of the present invention.

FIG. 2 is a schematic flow chart of a base station handover method according to a second embodiment of the present invention, and the method includes:

Step S21: A base station controller detects that a mobile terminal is handed over from a first base station with low configuration to a second base station with high configuration.

This step is the same as step S11 in FIG. 1, which is not described herein.

Step S22: The base station controller determines whether a load of the second base station is higher than a preset threshold.

The base station controller may determine whether the load of the second base station is higher than the preset threshold by detecting at least one item of: transmit power of a carrier frequency, an RSSI (received signal strength indicator) value, walsh code usage, the number of users, the number of equivalent users, and the number of equivalent channels of the second base station.

Specifically, when the base station controller detects that any one or more items in the following are satisfied: The transmit power of the carrier frequency of the second base station is greater than a first preset threshold, the received signal strength indicator RSSI value of the second base station is greater than a second preset threshold, the Walsh code usage of the second base station is greater than a third preset threshold, the number of users of the second base station is greater than a fourth preset threshold, the number of equivalent users of the second base station is greater than a fifth preset threshold, and the number of equivalent channels of the second base station is greater than a sixth preset threshold, the base station controller determines that the load of the second base station is higher than the preset threshold.

Further, when the base station controller determines that the load of the second base station is higher than the preset threshold, step S23 is performed; and when the base station controller determines that the load of the second base station is lower than the preset threshold, a current radio configuration mode of the mobile terminal may be maintained.

Step S23: The base station controller instructs the mobile terminal to switch a radio configuration mode between the mobile terminal and the second base station to a high-capacity radio configuration mode, and the procedure ends.

This step is the same as step S12 in FIG. 1, which is not described herein.

In this embodiment, when a load of a second base station is higher than a preset threshold, a base station controller instructs a mobile terminal to switch a radio configuration mode between the mobile terminal and the second base station to a high-capacity radio configuration mode, so as to achieve a purpose of increasing the capacity of a base station and then lowering a load of the base station by improving a radio configuration mode of the mobile terminal.

Figure 3:
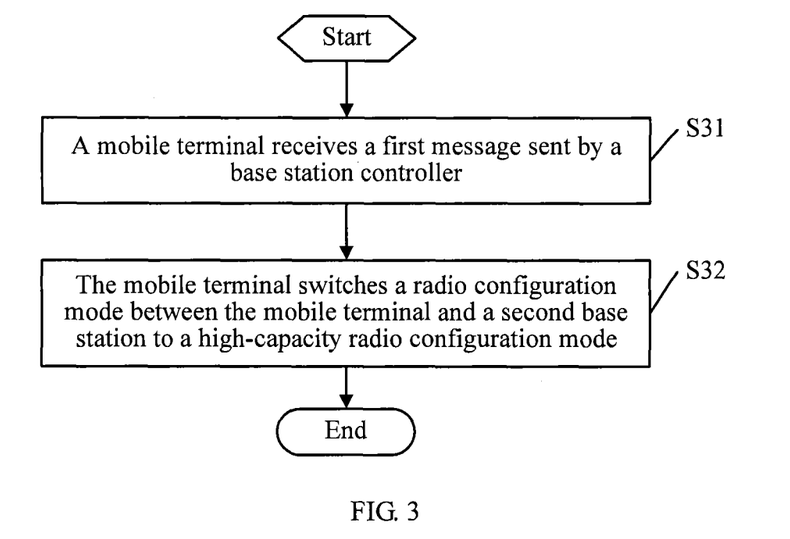
FIG. 3 is a schematic flow chart of a base station handover method according to a third embodiment of the present invention.

FIG. 3 is a schematic flow chart of a base station handover method according to a third embodiment of the present invention, and the method includes:

Step S31: A mobile terminal receives a first message sent by a base station controller, where the first message is used to instruct the mobile terminal to switch a radio configuration mode between the mobile terminal and a second base station from a low-capacity radio configuration mode to a high-capacity radio configuration mode.

The first message received by the mobile terminal may be sent when the base station controller detects that a load of the second base station is higher than a preset threshold.

Step S32: The mobile terminal makes a response to the first message, and switches the radio configuration mode between the mobile terminal and the second base station to the high-capacity radio configuration mode.

In this embodiment, a mobile terminal switches a radio configuration mode between the mobile terminal and a second base station from a low-capacity radio configuration mode to a high-capacity radio configuration mode, thereby increasing the capacity of the second base station.

Figure 4:
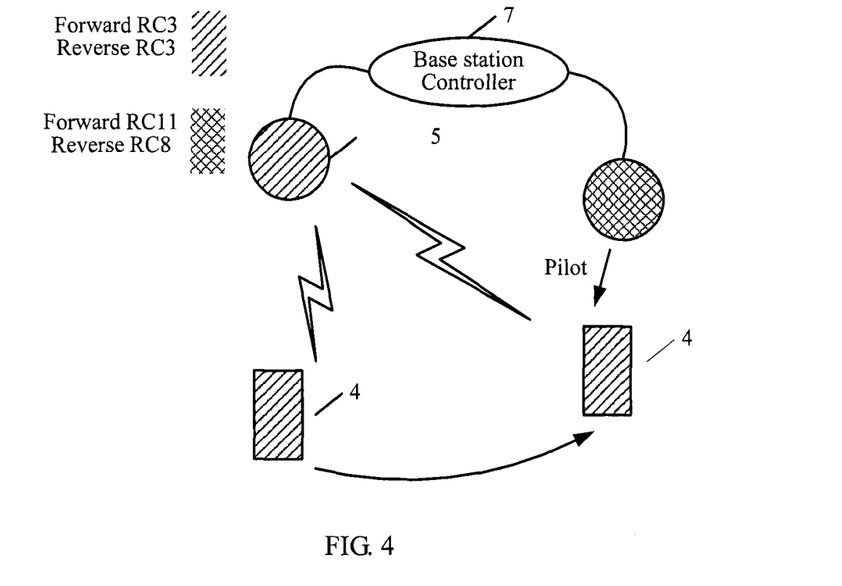
FIG. 4 to FIG. 6 are schematic diagrams of handing over a mobile terminal from a first base station to a second base station according to the present invention.
Figure 5:
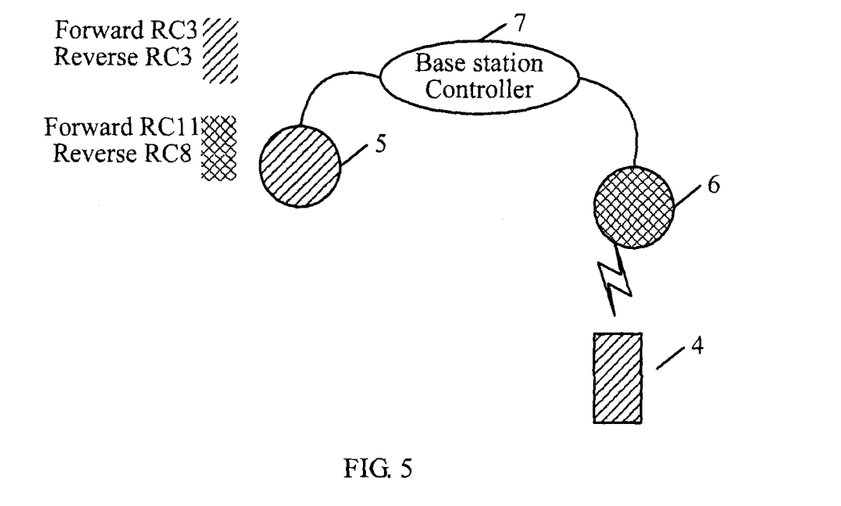
Figure 6:
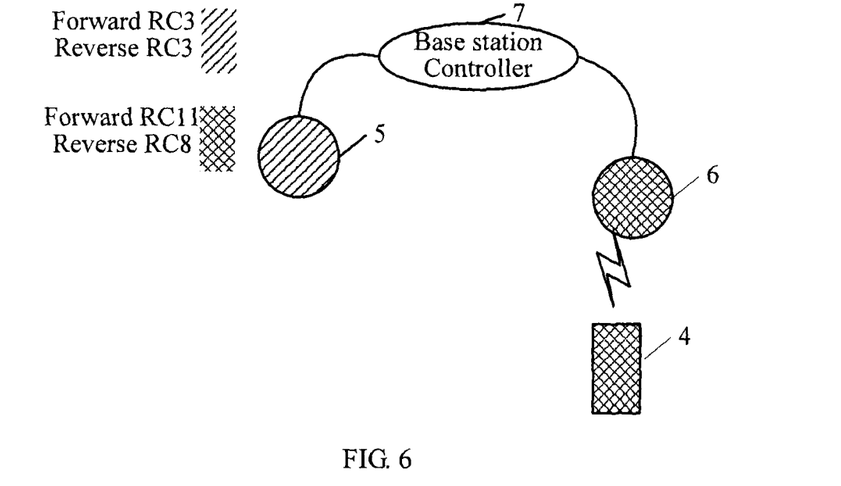

FIG. 4 to FIG. 6 are schematic diagrams of a process of handing over a mobile terminal from a first base station to a second base station according to the present invention, which mainly includes:

In FIG. 4, a mobile terminal 4 establishes a call in a first base station 5 and works in a radio configuration mode provided by the first base station 5, where the radio configuration mode is forward RC3 and reverse RC3. During a conversation, the mobile terminal 4 moves to a coverage area of a second base station 6 along a direction of an arrow shown in the figure. When moving to a boundary between the first base station 5 and the second base station 6, the mobile terminal 4 searches out a pilot signal of the second base station 6 and measures the pilot signal of the second base station 6, so as to obtain a pilot signal strength measurement report; and the mobile terminal 4 sends the pilot signal strength measurement report obtained through measurement to a base station controller 7. The base station controller 7 analyzes the pilot signal strength measurement report, and finds that if the second base station 6 provides a service for the mobile terminal 4, better conversation quality is obtained. Therefore, the base station controller 7 sends a handover instruction message to the mobile terminal 4, so as to guide the mobile terminal 4 to be handed over to the second base station 6. After receiving the handover instruction message, the mobile terminal 4 establishes a connection to the second base station 6 at the same time when maintaining a connection to the first base station 5; and after establishment of the connection to the second base station 6 is completed, the mobile terminal 4 breaks the connection to the first base station 5, so as to implement handover to the second base station 6 in a soft handover manner.

A schematic diagram after the mobile terminal 4 is handed over to the second base station 6 is as shown in FIG. 5. In FIG. 5, after the mobile terminal 4 is handed over to the second base station 6, although a radio configuration mode of the second base station 6 is forward RC11 and reverse RC8, the mobile terminal 4 stills works in a radio configuration mode of forward RC3 and reverse RC3. It should be noted that, because a level of forward RC11 is higher than a level of forward RC3, forward RC11 is compatible with forward RC3; and because a level of reverse RC8 is higher than a level of reverse RC3, reverse RC8 is compatible with reverse RC3.

In FIG. 5, when detecting that a load of the second base station 6 is higher than a preset threshold, the base station controller 7 sends a first message to the mobile terminal 4, where the first message is used to instruct the mobile terminal to switch from a low-capacity radio configuration mode to a high-capacity radio configuration mode. The mobile terminal 4 makes a responses to the first message and switches from the low-capacity radio configuration mode to the high-capacity radio configuration mode, that is, switches a radio configuration mode from forward RC3 and reverse RC3 to forward RC11 and reverse RC8; for example, the mobile terminal 4 may switch the radio configuration mode from forward RC3 and reverse RC3 to forward RC11 and reverse RC8 by adopting a hard handover manner, that is, the mobile terminal 4 first breaks a connection (instantaneously) to the second base station 6, then establishes a connection to the second base station 6, and uses forward RC11 and reverse RC8 when establishing the connection. A schematic diagram after the mobile terminal 4 switches to forward RC11 and reverse RC8 is as shown in FIG. 6.

Figure 7:
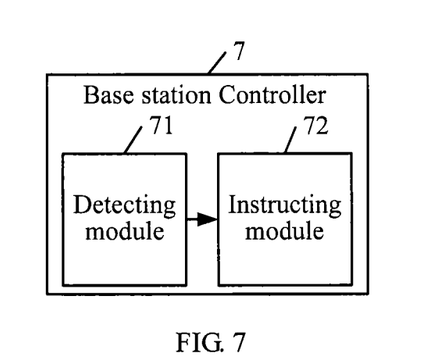
FIG. 7 is a schematic structural diagram of a base station controller according to a first embodiment of the present invention.

FIG. 7 is a schematic structural diagram of a base station controller according to a first embodiment of the present invention, and the base station controller 7 includes hardware to implement:

A detecting module 71 is configured to detect that a mobile terminal is handed over from a first base station with low configuration to a second base station with high configuration.

The mobile terminal may be handed over from the first base station to the second base station by adopting a soft handover manner. Because the first base station is a base station with low configuration, a radio configuration mode between the mobile terminal and the first base station is a low-capacity radio configuration mode; and when the mobile terminal is handed over from the first base station to the second base station, although the second base station supports a high-capacity radio configuration mode, a radio configuration mode between the mobile terminal and the second base station is still a low-capacity radio configuration mode. It should be noted that, generally, the higher a level of radio configuration is, the larger the capacity of the radio configuration is, for example, when forward RC3 is compared with forward RC11, because a level 11 of RC11 is higher than a level 3 of RC3, RC11 has higher capacity than RC3.

An instructing module 72 is configured to instruct the mobile terminal to switch a radio configuration mode between the mobile terminal and the second base station to a high-capacity radio configuration mode.

When being handed over to the second base station, the mobile terminal still uses a low-capacity radio configuration mode (at this time, low-capacity radio configuration is provided by the second base station) that is the same as that of the first base station; however, the second base station is a base station with high configuration and can provide high-capacity radio configuration. Therefore, the instructing module 72 may send a radio configuration mode switching instruction message to the mobile terminal, so as to instruct the mobile terminal to switch from a low-capacity radio configuration mode to a high-capacity radio configuration mode, thereby making full use of a radio configuration resource of the second base station and increasing the capacity of the second base station. It should be noted that, the mobile terminal herein should also support a high-capacity radio configuration mode.

In this embodiment, after a mobile terminal is handed over from a first base station with low configuration to a second base station with high configuration, a base station controller 7 instructs the mobile terminal to switch a radio configuration mode between the mobile terminal and the second base station to a high-capacity radio configuration mode, thereby avoiding that the mobile terminal still uses a low-capacity radio configuration mode when in the second base station and increasing the capacity of the second base station.

Figure 8:
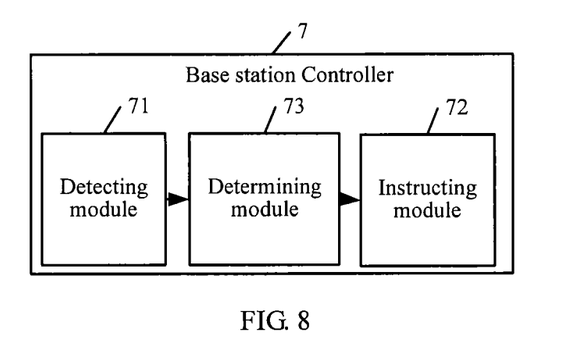
FIG. 8 is a schematic structural diagram of a base station controller according to a second embodiment of the present invention.

FIG. 8 is a schematic structural diagram of a base station controller according to a second embodiment of the present invention, where the base station controller 7 includes hardware to implement:

A detecting module 71 is configured to detect that a mobile terminal is handed over from a first base station with low configuration to a second base station with high configuration.

The detecting module 71 in FIG. 8 is the same as the detecting module 71 in FIG. 7, which is not described herein.

A determining module 73 is configured to determine whether a load of the second base station is higher than a preset threshold.

The determining module 73 may determine whether the load of the second base station is higher than the preset threshold by detecting at least one item of: transmit power of a carrier frequency, an RSSI (received signal strength indicator) value, walsh code usage, the number of users, the number of equivalent users, and the number of equivalent channels of the second base station.

Specifically, when the determining module 73 detects that any one or more items in the following are satisfied: The transmit power of the carrier frequency of the second base station is greater than a first preset threshold, the received signal strength indicator RSSI value of the second base station is greater than a second preset threshold, the Walsh code usage of the second base station is greater than a third preset threshold, the number of users of the second base station is greater than a fourth preset threshold, the number of equivalent users of the second base station is greater than a fifth preset threshold, and the number of equivalent channels of the second base station is greater than a sixth preset threshold, the determining module 73 determines that the load of the second base station is higher than the preset threshold.

An instructing module 72 is configured to, when a determination result of the determining module 73 is yes, instruct the mobile terminal to switch a radio configuration mode between the mobile terminal and the second base station to a high-capacity radio configuration mode.

It should be understood that, when the determination result of the determining module 73 is no, the instructing module 72 does not perform an operation of instructing the mobile terminal to switch the radio configuration mode between the mobile terminal and the second base station to the high-capacity radio configuration mode, that is, maintains a radio configuration mode of the mobile terminal.

In this embodiment, when a load of a second base station is higher than a preset threshold, a mobile terminal is instructed to switch a radio configuration mode between the mobile terminal and the second base station to a high-capacity radio configuration mode, so as to achieve a purpose of increasing the capacity of a base station and then lowering a load of the base station by improving a radio configuration mode of the mobile terminal.

Figure 9:
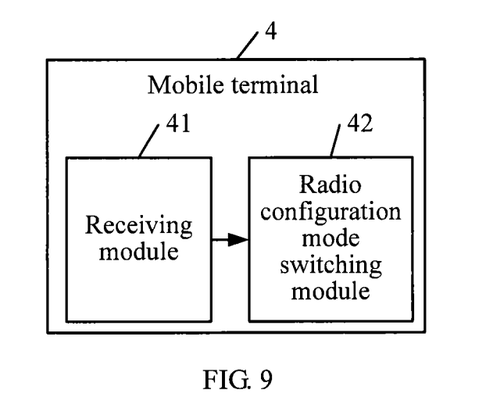
FIG. 9 is a schematic structural diagram of a mobile terminal according to an embodiment of the present invention.

FIG. 9 is a schematic structural diagram of a mobile terminal according to an embodiment of the present invention, and the mobile terminal 4 includes hardware to implement:

A receiving module 41 is configured to receive a first message sent by a base station controller, where the first message is used to instruct the mobile terminal to switch a radio configuration mode between the mobile terminal and a second base station from a low-capacity radio configuration mode to a high-capacity radio configuration mode.

Specifically, the first message received by the receiving module 41 may be sent when the base station controller detects that a load of the second base station is higher than a preset threshold.

A radio configuration mode switching module 42 is configured to make a response to the first message and switch the radio configuration mode between the mobile terminal and the second base station to the high-capacity radio configuration mode.

In this embodiment, a mobile terminal switches a radio configuration mode between the mobile terminal and a second base station from a low-capacity radio configuration mode to a high-capacity radio configuration mode, thereby increasing the capacity of the second base station.

Persons of ordinary skill in the art may understand that all or a part of the procedures of the methods in the foregoing embodiments may be implemented by a computer program instructing relevant hardware. The program may be stored in a computer readable storage medium. When the program is run, the procedures of the methods in the foregoing embodiments are performed. The storage medium may be a magnetic disk, an optical disk, a read-only memory (ROM), a random access memory (RAM), or the like.

The foregoing disclosures are merely exemplary embodiments of the present invention and definitely, are not intended to limit the scope of rights of the present invention. Persons of ordinary skill in the art may understand that all or a part of the procedures for implementing the foregoing embodiments, and equivalent variations made according to the claims of the present invention still falls within the scope of the present invention.

What is claimed is:

1. A base station handover method, comprising:
   detecting, by a base station controller, that a mobile terminal is handed over from a first base station with low configuration to a second base station with high configuration; and
   after said detecting detects that the mobile terminal is handed over,
     determining, by the base station controller, whether a load of the second base station is higher than a preset threshold,
     when said determining determines that the load of the second base station is higher than the preset threshold, instructing, by the base station controller, the mobile terminal to switch a radio configuration mode between the mobile terminal and the second base station to a high-capacity radio configuration mode that is higher capacity than a radio configuration mode between the mobile terminal and the first base station before the mobile terminal was handed over, and
     when said determining determines that the load of the second base station is not higher than the preset threshold, maintaining, by the mobile terminal, the radio configuration mode before the mobile terminal was handed over.

2. The method according to claim 1, wherein when any one or more items of the following are satisfied: Transmit power of a carrier frequency of the second base station is greater than a first preset threshold, a received signal strength indicator RSSI value of the second base station is greater than a second preset threshold, Walsh code usage of the second base station is greater than a third preset threshold, the number of users of the second base station is greater than a fourth preset threshold, the number of equivalent users of the second base station is greater than a fifth preset threshold, and the number of equivalent channels of the second base station is greater than a sixth preset threshold, the base station controller determines that the load of the second base station is higher than the preset threshold.

3. A base station handover method, comprising:
receiving, by a mobile terminal, a first message sent by a base station controller when it is detected by the base station controller that the mobile terminal is handed over from a first base station to a second base station and it is determined by the base station controller that a load of the second base station is higher than a preset threshold, wherein the first message is used to instruct the mobile terminal to switch a radio configuration mode between the mobile terminal and the second base station from a low-capacity radio configuration mode to a high-capacity radio configuration mode;
after receiving the first message,
    making, by the mobile terminal, a response to the first message, and switching the radio configuration mode between the mobile terminal and the second base station to the high-capacity radio configuration mode; and
when it is detected by the base station controller that the mobile terminal is handed over from the first base station to the second base station and it is determined by the base station controller that the load of the second base station is not higher than the preset threshold, maintaining, by the mobile terminal, the low-capacity radio configuration mode.

4. A base station controller, comprising:
processing hardware configured to:
detect that a mobile terminal is handed over from a first base station with low configuration to a second base station with high configuration; and
after detecting that the mobile terminal is handed over,
    determine whether a load of the second base station is higher than a preset threshold,
    when it is determined that the load of the second base station is higher than the preset threshold, instruct the mobile terminal to switch a radio configuration mode between the mobile terminal and the second base station to a high-capacity radio configuration mode that is higher capacity than a radio configuration mode between the mobile terminal and the first base station before the mobile terminal was handed over, and
    when it is determined that the load of the second base station is not higher than the preset threshold, not instruct the mobile terminal to switch the radio configuration mode, so that the mobile terminal thereby maintains the radio configuration mode before the mobile terminal was handed over.

5. The base station controller according to claim 4, wherein when any one or more items of the following are satisfied: Transmit power of a carrier frequency of the second base station is greater than a first preset threshold, a received signal strength indicator RSSI value of the second base station is greater than a second preset threshold, Walsh code usage of the second base station is greater than a third preset threshold, the number of users of the second base station is greater than a fourth preset threshold, the number of equivalent users of the second base station is greater than a fifth preset threshold, and the number of equivalent channels of the second base station is greater than a sixth preset threshold, the processing hardware determines that the load of the second base station is higher than the preset threshold.

6. A mobile terminal, comprising:
processing hardware configured to:
receive a first message sent by a base station controller when it is detected by the base station controller that the mobile terminal is handed over from a first base station to a second base station and it is determined by the base station controller that a load of the second base station is higher than a preset threshold, wherein the first message is used to instruct the mobile terminal to switch a radio configuration mode between the mobile terminal and the second base station from a low-capacity radio configuration mode to a high-capacity radio configuration mode;
after receiving the first message, make a response to the first message and switch the radio configuration mode between the mobile terminal and the second base station to the high-capacity radio configuration mode; and
when it is detected by the base station controller that the mobile terminal is handed over from the first base station to the second base station and it is determined by the base station controller that the load of the second base station is not higher than the preset threshold, maintain the mobile terminal at the low-capacity radio configuration mode.

* * * * *